United States Patent
Beser (10) Patent No.: US 6,212,563 B1
(45) Date of Patent: Apr. 3, 2001

(54) METHOD AND SYSTEM FOR SETTING AND MANAGING EXTERNALLY PROVIDED INTERNET PROTOCOL ADDRESSES USING THE DYNAMIC HOST CONFIGURATION PROTOCOL

(75) Inventor: Nurettin B. Beser, Evanston, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/164,744

(22) Filed: Oct. 1, 1998

(51) Int. Cl.$^7$ ................................................ G06F 13/00

(52) U.S. Cl. .................... 709/227; 709/217; 709/223; 709/228; 709/229

(58) Field of Search ................................ 709/217, 219, 709/223, 225, 226, 227, 228, 229, 237

(56) References Cited

U.S. PATENT DOCUMENTS

| | | |
|---|---|---|
| 5,014,234 | 5/1991 | Edwards, Jr. ........................ 364/900 |
| 5,138,712 | 8/1992 | Corbin ................................. 395/700 |
| 5,347,304 | 9/1994 | Moura et al. . |
| 5,442,749 | 8/1995 | Northcutt et al. .............. 395/200.09 |
| 5,488,412 | 1/1996 | Majeti et al. . |
| 5,489,897 | 2/1996 | Inoue ............................... 340/870.39 |
| 5,583,931 | 12/1996 | Schneider et al. . |
| 5,586,121 | 12/1996 | Moura et al. . |
| 5,600,717 | 2/1997 | Schneider et al. . |
| 5,606,606 | 2/1997 | Schneider et al. . |
| 5,608,446 | 3/1997 | Carr et al. . |
| 5,623,542 | 4/1997 | Schneider et al. . |
| 5,623,601 | 4/1997 | Vu .................................. 395/187.01 |
| 5,636,211 | 6/1997 | Newlin et al. . |

(List continued on next page.)

OTHER PUBLICATIONS

S. Adiraju, J. Fijolek, Memorandum "IPCDN Telephony Return MIB" Mar. 23, 1998.

R. Droms, "Dunamic Host Configuration Protocol" Mar. 1997.

Data–Over–Cable Interface Specification, "Security System Specification" May 6, 1997.

Data–Over–Cable Service Interface Specifications, "Radio Frequency Interface Specification" Oct. 8, 1997.

Data–Over–Cable Service Interface Specifications, "Baseline Privacy Interface Specification" Sep. 22, 1997.

Data–Over–Cable Service Interface Specifications, "Removable Security Module Interface Specification" Feb. 8, 1998.

Data–Over–Cable Service Interface Specifications, "Cable Modem Termination System—Network Side Interface Specification" Jul. 2, 1996.

Data–Over–Cable Service Interface Specifications, "Operations Support System Interface Specification Baseline privacy Interface MIB" Mar. 31, 1998.

Data–Over–Cable Service Interface Specifications, "Cable Modem to Customer Premise Equipment Interface Specification" Mar. 17, 1998.

Data–Over Cable Service Interface Specifications, "Cable Modem Telephony Return Interface Specification" Aug. 4, 1997.

*Primary Examiner*—Viet D. Vu
(74) *Attorney, Agent, or Firm*—McDonnell Boehnen Hulbert & Berghoff (57) ABSTRACT

A system and method for allocating IP addresses for network devices using the dynamic host configuration protocol (DHCP) wherein the DHCP server returns the requested IP address every time the IP address is requested. A client identifier is generated for each network device as a function of the IP address. The client identifier is used in the DHCP options field of the DHCP parameter list in a DHCPDISCOVERY message. The DHCP server indexes the network device configuration parameters according to the client identifier and returns the same IP address each time the DHCP is queried.

19 Claims, 6 Drawing Sheets

U.S. PATENT DOCUMENTS

| | | | |
|---|---|---|---|
| 5,675,732 | 10/1997 | Majeti et al. | |
| 5,710,885 | 1/1998 | Bondi | 709/224 |
| 5,761,602 | 6/1998 | Wagner et al. | 455/3.1 |
| 5,778,181 | 7/1998 | Hidary et al. | 395/200.48 |
| 5,790,198 | 8/1998 | Roop et al. | 348/460 |
| 5,790,548 | 8/1998 | Sistanizadeh et al. | 370/401 |
| 5,790,677 | 8/1998 | Fox et al. | 380/24 |
| 5,799,086 | 8/1998 | Sudia | 380/23 |
| 5,805,804 | 9/1998 | Laursen et al. | 348/7 |
| 5,812,819 * | 9/1998 | Rodwin et al. | 395/500.44 |
| 5,818,845 | 10/1998 | Moura et al. | 370/449 |
| 5,819,042 | 10/1998 | Hansen | 714/756 |
| 5,828,655 | 10/1998 | Moura et al. | 370/326 |
| 5,835,727 | 11/1998 | Wong et al. | 395/200.68 |
| 5,854,901 | 12/1998 | Cole et al. | 709/245 |
| 5,859,852 | 1/1999 | Moura et al. | 370/449 |
| 5,864,679 | 1/1999 | Kanai et al. | 709/238 |
| 5,870,134 | 2/1999 | Laubach et al. | 348/12 |
| 5,872,523 | 2/1999 | Dellaverson et al. | 340/825.52 |
| 5,884,024 | 3/1999 | Lim et al. | 395/187.01 |
| 5,922,049 * | 7/1999 | Radia et al. | 709/220 |
| 5,923,659 | 7/1999 | Curry et al. | 370/401 |
| 5,958,007 | 9/1999 | Lee et al. | 709/219 |
| 5,974,453 * | 10/1999 | Andersen et al. | 709/220 |
| 5,996,076 | 11/1999 | Rowney et al. | 713/201 |
| 6,009,103 * | 12/1999 | Woundy | 370/401 |
| 6,012,088 | 1/2000 | Li et al. | 709/219 |
| 6,013,107 * | 1/2000 | Blackshear et al. | 703/229 |
| 6,018,767 | 1/2000 | Fijolek et al. | 709/218 |
| 6,049,826 | 4/2000 | Beser | 709/222 |
| 6,058,421 | 5/2000 | Fijolek et al. | 709/225 |
| 6,070,246 | 5/2000 | Beser | 713/201 |

* cited by examiner

| DCHP PARAMETER | DESCRIPTION |
|---|---|
| OP | MESSAGE OP CODE/MESSAGE TYPE 1 BOOTREQUEST, 2 = BOOTREPLY. |
| HTYPE | HARDWARE ADDRESS TYPE (E.G., '1'=10 MPS ETHERNET). |
| HLEN | HARDWARE ADDRESS LENGTH (E.G. '6' FOR 10 MBPS ETHERNET). |
| HOPS | CLIENT SETS TO ZERO, OPTIONALLY USED BY RELAY-AGENTS WHEN BOOTING VIA A RELAY AGENT. |
| XID | TRANSACTION ID, A RANDOM NUMBER CHOSEN BY THE CLIENT, USED BY THE CLIENT AND SERVER TO ASSOCIATE MESSAGES AND RESPONSES BETWEEN A CLIENT AND A SERVER. |
| SECS | FILLED IN BY CLIENT, SECONDS ELAPSED SINCE CLIENT STARTED TRYING TO BOOT. |
| FLAGS | FLAGS INCLUDING A BROADCAST BIT. |
| CIADDR | IPADDRn |
| YIADDR | 'YOUR' (CLIENT) IP ADDRESS. |
| SIADDR | IP 54 ADDRESS OF NEXT SERVER TO USE IN BOOTSTRAP; RETURNED IN DHCPOFFER, DHCPACK AND DHCPNAK BY SERVER. |
| GIADDR | GATEWAY RELAY AGENT IP 54 ADDRESS, USED IN BOOTING VIA A RELAY-AGENT |
| CHADDR | CLIENT HARDWARE ADDRESS (E.G., MAC LAYER 44 ADDRESS). |
| SNAME | OPTIONAL SERVER HOST NAME, NULL TERMINATED STRING. |
| FILE | BOOT FILE NAME, TERMINATED BY A NULL STRING. |
| OPTIONS: CLIENT IDENTIFIER | CLIENT IDENTIFIER=UNIQUE_IDENTIFIER (IPADDRn) |

FIG.7

| DHCP DATABASE | |
|---|---|
| CLIENT IDENTIFIER | IP ADDRESS |
| CLIENT IDENTIFIER 1 | IPADDR 1 |
| CLIENT IDENTIFIER 2 | IPADDR 2 |
| CLIENT IDENTIFIER 3 | IPADDR 3 |
| CLIENT IDENTIFIER 4 | IPADDR 4 |
| CLIENT IDENTIFIER 5 | IPADDR 5 |
| CLIENT IDENTIFIER 6 | IPADDR 6 |
| CLIENT IDENTIFIER 7 | IPADDR 7 |
| CLIENT IDENTIFIER 8 | IPADDR 8 |
| CLIENT IDENTIFIER 9 | IPADDR 9 |
| CLIENT IDENTIFIER 10 | IPADDR 10 |
| CLIENT IDENTIFIER 11 | IPADDR 11 |
| CLIENT IDENTIFIER 12 | IPADDR 12 |
| CLIENT IDENTIFIER 13 | IPADDR 13 |
| CLIENT IDENTIFIER 14 | IPADDR 14 |
| CLIENT IDENTIFIER 15 | IPADDR 15 |
| CLIENT IDENTIFIER 16 | IPADDR 16 |

METHOD AND SYSTEM FOR SETTING AND MANAGING EXTERNALLY PROVIDED INTERNET PROTOCOL ADDRESSES USING THE DYNAMIC HOST CONFIGURATION PROTOCOL

FIELD OF INVENTION

The present invention relates to communications in computer networks. More specifically, it relates to a method and system for managing network information in a computer network.

BACKGROUND OF THE INVENTION

The Internet, a world-wide-network of interconnected computers, provides multimedia content including audio, video, graphics and text that typically requires a large bandwidth for downloading and viewing. Most Internet Service Providers ("ISPs") allow customers to connect to the Internet via a serial telephone line from a Public Switched Telephone Network ("PSTN") at data rates including 14,400 bps, 28,800 bps, 33,600 bps, 56,000 bps and others.

Cable television networks typically are interconnected by cables such as coaxial cables or a Hybrid Fiber/Coaxial ("HFC") cable system which have data rates of about 10 Mega-bits-per-second ("Mbps") to 30+ Mbps. These data rates are much higher than the data rates available on the PSTN.

With the explosive growth of the Internet, many customers have desired to use the larger bandwidth of a cable television network to connect to the Internet and other computer networks. Cable modems, such as those provided by 3Com Corporation of Santa Clara, Calif., U.S. Robotics Corporation of Skokie, Ill., and others offer customers higher-speed connectivity to the Internet, an intranet, Local Area Networks ("LANs") and other computer networks via cable television networks. These cable modems currently support a data connection to the Internet and other computer networks via a cable television network with a "downstream" data rate of 30+ Mbps.

Cable television networks developed as unidirectional cable systems, supporting only a "downstream" data path. A downstream data path is the flow of data from a cable system "headend" to a customer. A cable system headend is a central location in the cable television network that is responsible for sending cable signals in the downstream direction. In order to use the cable system for data communication, a return data path must be provided. While bidirectional cable systems ("upstream" and "downstream" path over cable) are growing in number, many data over cable systems still use a return data path via a telephone network, such as a Public Switched Telephone Network. A cable television system with an upstream connection to a telephony network is called a "data-over-cable system with telephony return."

An exemplary data-over-cable system with telephony return includes a cable modem termination system, a cable television network, a public switched telephone network, a telephony remote access concentrator, a cable modem, customer premise equipment (e.g., a customer computer) and a data network (e.g., the Internet). The cable modem termination system and the telephony remote access concentrator together are called a "telephony return termination system."

The cable modem termination system receives data packets from the data network and transmits them downstream via the cable television network to a cable modem attached to the customer premise equipment. The customer premise equipment sends responses data packets to the cable modem, which sends response data packets upstream via the public switched telephone network to the telephony remote access concentrator, which sends the response data packets back to the appropriate host on the data network. The data-over-cable system with telephony return provides transparent Internet Protocol ("IP") data traffic between customer premise equipment, a cable modem and the data network (e.g., the Internet or an intranet). As is known in the art, IP is a routing protocol designed to route traffic within a network or between networks.

When a cable modem used in the data-over-cable system with telephony return is initialized, it will make a connection to both the cable modem termination system via the cable network and to the telephony remote access concentrator via the public switched telephone network. If the cable modem is using telephony return, it will acquire telephony connection parameters on a downstream connection from the cable modem termination system and establish a Point-to-Point Protocol ("PPP") connection to connect an upstream channel to the telephony remote access concentrator. As is known in the art, PPP is used to encapsulate datagrams over a serial communications link. After a PPP connection is established, the cable modem negotiates a telephony IP address with the telephony remote access concentrator. The telephony IP address allows the customer premise equipment to send IP data packets upstream to the telephony remote access concentrator via the public switched telephone network to the data network.

The cable modem also makes an IP connection to the cable modem termination system so that IP data received on the cable modem termination system from the data network can be forwarded downstream to the customer premise equipment via the cable network and the cable modem.

Once an IP address is obtained on the cable modem termination system, the cable modem obtains the name of a configuration file used to complete initialization. The cable modem downloads a configuration file from a central location in the data-over-cable system using a Trivial File Transfer Protocol ("TFTP") server. As is known in the art, TFTP is a very simple protocol used to transfer files, where any error during file transfer typically causes a termination of the file transfer.

In a typical network, such as an Internet, a subnet, or an intranet, a Dynamic Host Configuration Protocol ("DHCP") is used by a network device to obtain an IP address on a DHCP server from which configuration parameters are obtained. The IP address and the configuration parameters are used by the device to communicate with any other device that is connected to the network. One advantage of using the DHCP to obtain IP addresses is that other configuration information that is important to the network device may be obtained in a single exchange of messages. These messages include the DHCPDISCOVER, DHCPOFFER, DHCPREQUEST, and DHCPACKNOWLEDGE and are documented in Request for Comments ("RFC"), RFC-2131 and RFC-2132, which may be obtained from the Internet Engineering Task Force ("IETF").

The DHCP provides IP addresses to clients in several scenarios. In one, the client chooses the IP address that is communicated by the DHCP in the DHCPOFFER message in response to a DHCPDISCOVER message. The DHCP client then sends a DHCPREQUEST message and, if the DHCP server accepts the request, the server sends a DHCPACKNOWLEDGE message. At that moment, the IP address is assigned to the client.

If a previous communication had been made by the network device to the DHCP, a previously assigned IP address may be retrieved in a DHCPOFFER message. A desired IP address may also be requested in the DHCPDISCOVER message even if an IP address is requested, the network device has no choice over the address selected.

Some networks, such as telco-return cable modem networks, are comprised of a large number of network devices. It is desirable to manage the network devices from a central network administrator. It would be desirable to manage the IP addresses of the network devices in the central network administrator but distribute the IP addresses locally. The network devices are also identified by a client identifier. The client identifier may be passed to the DHCP server which uses the client identifier as an index to the DHCP database. There is therefore no way to easily determine the network devices to which the IP addresses are assigned.

It would be desirable to distribute the IP addresses from local sources but at the same time, retain the IP address allocated in the central server (DHCP server). In this manner, the IP addresses will be distributed using an entity external to the DHCP while benefiting from the other resources available from the DHCP.

SUMMARY OF THE INVENTION

In view of the above, the present invention is directed to a method for permanently allocating an Internet protocol (IP) address for a network device in a network using a dynamic host configuration protocol (DHCP) server. According to the method, a unique client identifier is generated using the IP address in a client identifier function. The IP address is used in a selected IP address parameter and the client identifier is used in an options parameter field in a DHCP parameter list. The DHCP parameter list is sent in a DHCPDISCOVER message to the DHCP server. A DHCPOFFER message is received from the DHCP server. The IP address and the client identifier are then used in subsequent DHCP messages to the DHCP server.

In another aspect of the present invention, an improved system is provided for allocating an Internet protocol (IP) address to a network device. The network device is connected to a network having a dynamic host configuration protocol (DHCP) server. An Client ID generator is provided to generate a client identifier as a function of the IP address. A DHCP parameter list is generated having a selected IP address set to the IP address and a DHCP option field set to the client identifier.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 6B shows a DHCP message for requesting an IP address according to a preferred embodiment of the present invention; and FIG. 7 shows a table illustrating a client identifier and IP address correlation that may be obtained from the DHCP database.

DETAILED DESCRIPTION OF THE PREFERRED EMBODIMENT

The description that follows fully incorporates by reference the following co-pending patent applications: "METHOD AND SYSTEM FOR SECURE CABLE MODEM INITIALIZATION", U.S. Pat. Ser. No. 09/018,756 to Nurettin B. Beser (filed Feb. 4, 1998 and assigned to the assignee of the present invention), now U.S. Pat. No. 6,070,246; "METHOD AND SYSTEM FOR SECURE CABLE MODEM REGISTRATION", U.S. Pat. Ser. No. 09/018,372 to Nurettin B. Beser (filed May 14, 1998 and assigned to the assignee of the present invention); and "METHOD AND SYSTEM FOR CABLE MODEM INITIALIZATION USING DYNAMIC SERVERS", U.S. Pat. Ser. No. 09/018,400 to Nurettin B. Beser (filed May 14, 1998), now U.S. Pat. No. 6,049,826.

In the description that follows, preferred embodiments of the present invention are described using a data-over-cable system. It is to be understood by one of ordinary skill in the art that preferred embodiments of the present invention may be carried out in any suitable network in which it is desired to manage Internet protocol (IP) addresses for a plurality of network devices.

A. Cable Modem System

Figure 1:
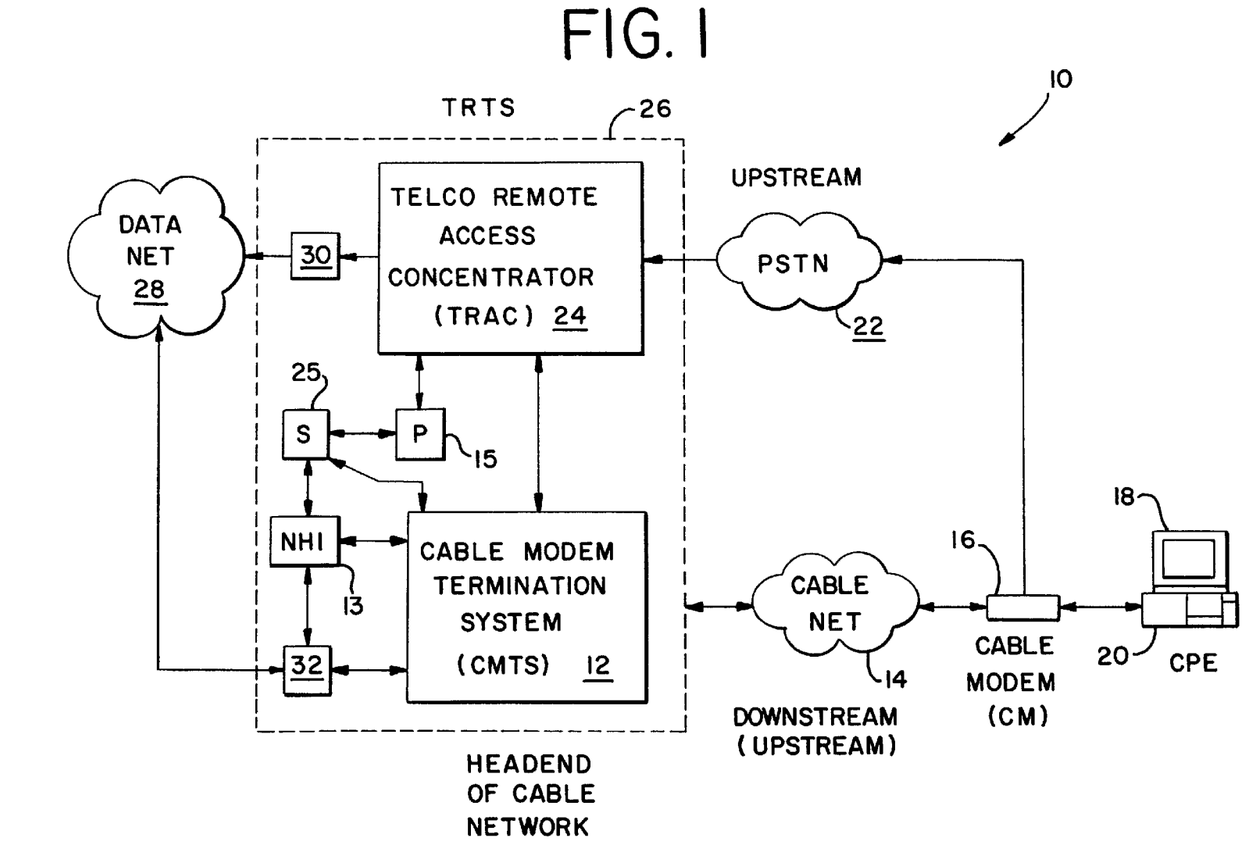
FIG. 1 is a block diagram illustrating a cable modem system with telephony return.

FIG. 1 is a block diagram illustrating a data-over-cable system with telephony return 10, hereinafter data-over-cable system 10. Most cable providers known in the art predominately provide uni-directional cable systems, supporting only a "downstream" data path. A downstream data path is the flow of data from a cable television network "headend" to customer premise equipment (e.g., a customer's personal computer). A cable television network headend is a central location that is responsible for sending cable signals in a downstream direction. A return path via a telephony network ("telephony return") is typically used for an "upstream" data path in uni-directional cable systems. An upstream data path is the flow of data from customer premise equipment back to the cable television network headend.

However, data-over-cable system 10 of the present invention may also provide a bi-directional data path (i.e., both downstream and upstream) without telephony return as is also illustrated in FIG. 1. In a data-over cable system without telephony return, customer premise equipment or cable modem has an upstream connection to the cable modem termination system. The upstream connection may be made via a cable television connection, a wireless connection, a satellite connection, or a connection via other technologies to send data upstream to the cable modem termination system. It is to be understood by one of ordinary skill in the art that preferred embodiments of the present invention may be practiced using cable systems 10 with or without telephone return.

Data-over-cable system 10 includes a Cable Modem Termination System ("CMTS") 12 connected to a cable television network 14, hereinafter cable network 14. FIG. 1 illustrates one CMTS 12. However, data-over-cable system 10 can include multiple CMTS 12. Cable network 14 includes cable television networks such as those provided by Comcast Cable Communications, Inc., of Philadelphia, Pa, Cox Communications, or Atlanta, Ga., Tele-Communications, Inc., of Englewood Colo., Time-Warner Cable, of Marietta, Ga., Continental Cablevision, Inc., of Boston, Mass., and others. Cable network 14 is connected to a Cable Modem ("CM") 16 with a downstream cable connection.

The cable modem 16 is any cable modem such as those provided by 3 Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta, of Norcross, Ga. and others. FIG. 1 illustrates one cable modem 16. However, in a typical data-over-cable system, tens or hundreds of thousands of cable modem 16 are connected to CMTS 12.

Cable modem 16 is connected to Customer Premise Equipment ("CPE") 18 such as a personal computer system via a Cable Modem-to-CPE Interface ("CMCI") 20. Cable modem 16 is connected to a Public Switched Telephone Network ("PSTN") 22 with an upstream telephony connection. PSTN 22 includes those public switched telephone networks provided by AT&T, Regional Bell Operating Companies (e.g., Ameritch, U.S. West, Bell Atlantic, Southern Bell Communications, Bell South, NYNEX, and Pacific Telesis Group), GTE, and others. The upstream telephony connection is any of a standard telephone line connection, Integrated Services Digital Network ("ISDN") connection, Asymmetric Digital Subscriber Line ("ADSL") connection, or other telephony connection. PSTN 22 is connected to a Telephony Remote Access Concentrator ("TRAC") 24.

In a data-over cable system without telephony return, cable modem 16 has an upstream connection to CMTS 12. The upstream connection may be made via a cable television connection, a wireless connection, a satellite connection, or a connection via other technologies to send data upstream outside of the telephony return path. An upstream cable television connection via cable network 14 is illustrated in FIG. 1.

FIG. 1 illustrates a telephony modem integral to cable modem 16. In another embodiment of the present invention, the telephony modem is a separate modem unit external to cable modem 16 used specifically for connecting with PSTN 22. A separate telephony modem includes a connection to cable modem 16 for exchanging data. cable modem 16 includes cable modems provided by the 3 Com Corporation of Santa Clara, Calif., U.S. Robotics Corporation of Skokie, Ill., and others. In yet another embodiment of the present invention, cable modem 16 includes functionality to connect only to cable network 14 and receives downstream signals from cable network 14 and sends upstream signals to cable network 14 without telephony return. The present invention is not limited to cable modems used with telephony return.

CMTS 12 and TRAC 24 may be at a "headend" of cable system 10, or TRAC 24 may be located elsewhere and have routing associations to CMTS 12. CMTS 12 and TRAC 24 together are called a "Telephony Return Termination System" ("TRTS") 26. TRTS 26 is illustrated by a dashed box in FIG. 1. CMTS 12 and TRAC 24 make up TRTS 26 whether or not they are located at the headend of cable network 14, and TRAC 24 may in located in a different geographic location from CMTS 12. Content servers, operations servers, administrative servers and maintenance servers used in data-over-cable system 10 and shown as a server 25 may also be in different locations. Access points to data-over-cable system 10 are connected to one or more CMTS's 12 or cable headend access points. Such configurations may be "one-to-one", "one-to-many," or "many-to-many," and may be interconnected to other Local Area Networks ("LANs") or Wide Area Networks ("WANs").

TRAC 24 is connected to a data network 28 (e.g., the Internet or an intranet) by a TRAC-Network System Interface 30 ("TRAC-NSI"). CMTS 12 is connected to data network 28 by a CMTS-Network System Interface ("CMTS-NSI") 32.

Data-over-cable system 10 includes DHCP proxies 15, servers 25 and associated Network Host Interfaces 13 available on CMTS 12. Multiple DHCP proxies 15, servers 25 and network host interfaces 13 are illustrated as single boxes in FIG. 1. FIG. 1 also illustrates DHCP proxies 15 separate from TRAC 24. In one embodiment of the present invention, TRAC 24 includes DHCP proxy functionality and no separate DHCP proxies 15 are used. In such an embodiment, TRAC 24 forwards DHCP messages using a DHCP address field to DHCP servers available on CMTS 12.

The cable system 10 in FIG. 1 includes only one cable modem 16. The cable system 10 may include any number of cable modems 16 connected to the CMTS 12. Each cable modem 16 is capable of communicating over the Internet by using an Internet protocol (IP) address. The cable system 10 may include any number of CMTS' 12. Each TRAC 24 may include an IP address manager for keeping track of the IP addresses for the cable modems 16 that terminate to it. This way, the number of devices that might connect is related to the number of ports the TRAC 24 has to connect. The number of ports that the TRAC 24 connects to restricts the number of IP addresses that might be distributed. Otherwise, either the DHCP server has to distribute much more than sufficient number of IP addresses (i.e. the number of ports on the TRAC 24). It would be desirable to avoid wasting IP addresses.

B. Cable Modem Protocol Stack

Figure 2:
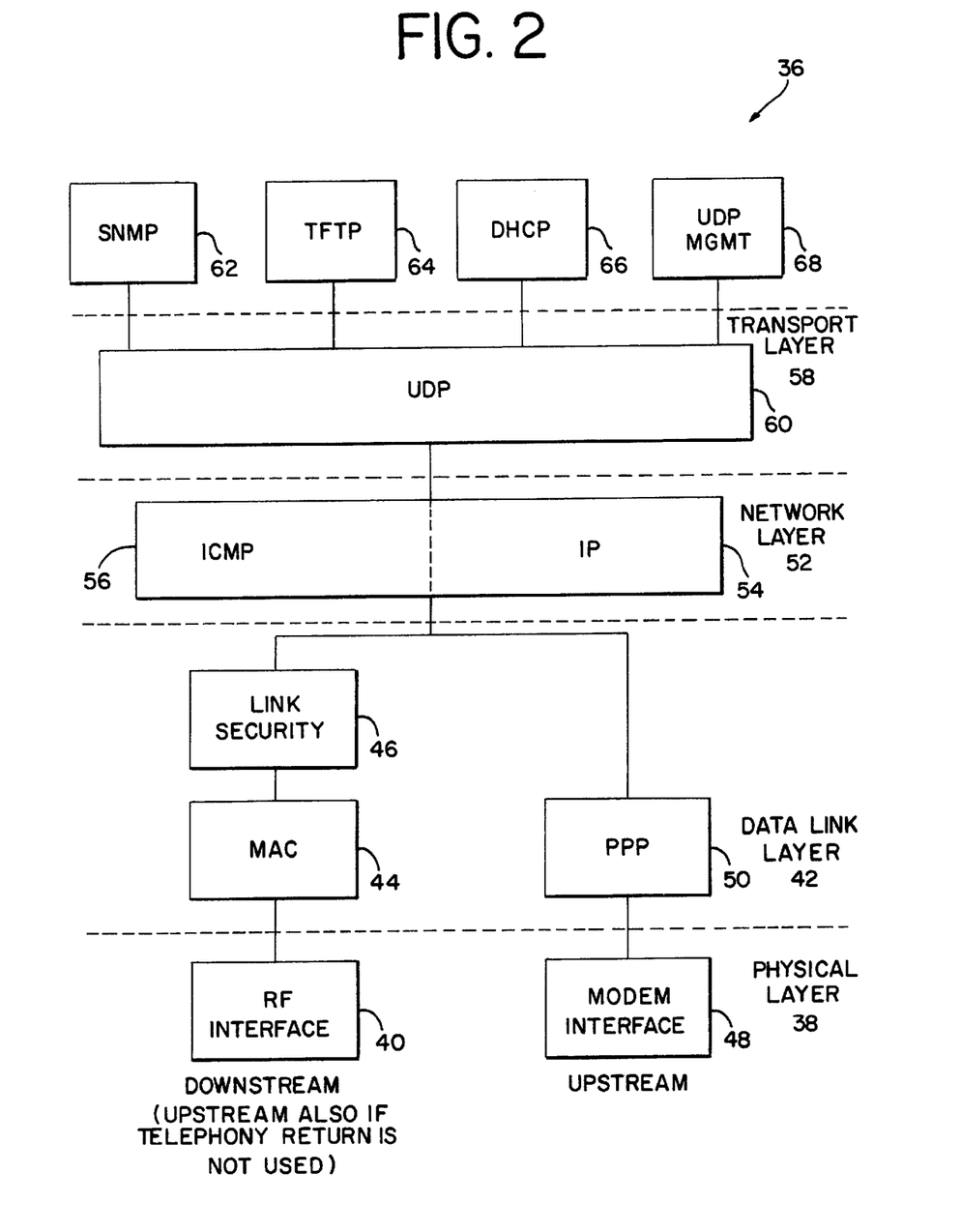
FIG. 2 is a block diagram illustrating a protocol stack for a cable modem.

FIG. 2 is a block diagram illustrating a protocol stack 36 for cable modem 16. FIG. 2 illustrates the downstream and upstream protocols used in cable modem 16. As is known in the art, the Open System Interconnection ("OSI") model is used to describe computer networks. The OSI model consists of seven layers including from lowest-to-highest, a physical, data-link, network, transport, session, application and presentation layer. The physical layer transmits bits over a communication link. The data link layer transmits error free frames of data. The network layer transmits and routes data packets.

For downstream data transmission, cable modem 16 is connected to cable network 14 in a physical layer 38 via a Radio Frequency ("RF") Interface 40. In a preferred embodiment of the present invention, RF Interface 40 has an operation frequency range of 50 Mega-Hertz ("MHz") to 1 Giga-Hertz ("GHz") and a channel bandwidth of 6 MHz. However, other operation frequencies may also be used and the invention is not limited to these frequencies. The channels are used in a typical cable network 14 to communicate various services, such as television channels. The cable network 14 includes one or more data channels, which are used to connect cable modems 16 to data network 28.

RF interface 40 uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels. In one embodiment of the present invention, QAM-64 is used in RF interface 40.

However, other operating frequencies modulation methods could also be used. For more information on RF interface 40 see the Institute of Electrical and Electronic Engineers ("IEEE") standard 802.14 for cable modems incorporated herein by reference. However, other RF interfaces 40 could also be used and the present invention is not limited to IEEE 802.14 (e.g., RF interfaces from Multimedia Cable Network Systems ("MCNS") and others could also be used).

Above RF interface 40 in a data-link layer 42 is a Medium Access Control ("MAC") layer 44. As is known in the art, MAC layer 44 controls access to a transmission medium via physical layer 38. For more information on MAC layer protocol 44 see IEEE 802.14 for cable modems. However, other MAC layer protocols 44 could also be used and the present invention is not limited to IEEE 802.14 MAC layer protocols (e.g., MCNS MAC layer protocols and others could be used).

Above MAC layer 44 is an optional link security protocol stack 46. Link security protocol stack 46 prevents authorized users from making a data connection from cable network 14. RF interface 40 and MAC layer 44 can be used for an upstream connection if data-over-cable system 10 is used without telephony return.

For upstream data transmission with telephony return, cable modem 16 is connected to PSTN 22 in physical layer 38 via modem interface 48. The International Telecommunications Union-Telecommunication Standardization Sector ("ITU-T", formerly known as the CCITT) defines standards for communication devices identified by "V.xx" series where "xx" is an identifying number.

In one embodiment of the present invention, ITU-T V.34 is used as modem interface 48. As is known in the art, ITU-T V.34 is commonly used in the data link layer for modem communications and currently allows data rates as high as 33,600 bits-per-second ("bps"). For more information, see the ITU-T V.34 standard. However, other modem interfaces or other telephony interfaces could also be used.

Above modem interface 48 in data link layer 42 is Point-to-Point Protocol ("PPP") layer 50, hereinafter PPP 50. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663 incorporated herein by reference.

Above both the downstream and upstream protocol layers in a network layer 52 is an Internet Protocol ("IP") layer 54. IP layer 54, hereinafter IP, roughly corresponds to OSI layer 3, the network layer, but is typically not defined as part of the OSI model. As is known in the art, IP is a routing protocol designed to route traffic within a network or between networks. For more information on IP see RFC-791 incorporated herein by reference.

Internet Control Message Protocol ("ICMP") layer 56 is used for network management. The main functions of ICMP layer 56, hereinafter ICMP 56, include error reporting, reachability testing (e.g., "pinging") congestion control, route-change notification, performance, subnet addressing and others. Since IP is an unacknowledged protocol, datagrams may be discarded and ICMP 56 is used for error reporting. For more information on ICMP 56 see RFC-971 incorporated herein by reference.

Above IP and ICMP 56 is a transport layer 58 with User Datagram Protocol layer 60 ("UDP"). UDP layer 60, hereinafter UDP 60, roughly corresponds to OSI layer 4, the transport layer, but is typically not defined as part of the OSI model. As is known in the art, UDP 60 provides a connectionless mode of communications with datagrams. For more information on UDP 60 see, RFC-768 incorporated herein by reference.

Above the network layer are a Simple Network Management Protocol ("SNMP") layer 62, Trivial File Protocol ("TFTP") layer 64, Dynamic Host Configuration Protocol ("DHCP") layer 66 and a UDP manager 68. SNMP layer 62 is used to support network management functions. For more information on SNMP layer 62 see RFC-1157 incorporated herein by reference. TFTP layer 64 is a file transfer protocol used to download files and configuration information. For more information on TFTP layer 64, see RFC-1350 incorporated herein by reference. DHCP layer 66 is a protocol for passing configuration information to hosts on an IP network. For more information on DHCP layer 66 see RFC-1541 and RFC-2131 incorporated herein by reference. UDP manager 68 distinguishes and routes packets to an appropriate service (e.g., a virtual tunnel). More or few protocol layers could also be used with data-over-cable system 10.

Cable modem 16 supports transmission and reception of IP datagrams as specified by RFC-791. CMTS 12 and TRAC 24 may perform filtering of IP datagrams. Cable modem 16 is configurable for IP datagram filtering to restrict cable modem 16 and CPE 18 to the use of only their assigned IP addresses. Cable modem 16 is configurable for IP datagram UDP 60 port filtering (i.e., deep filtering).

Cable modem 16 forwards IP datagrams destined to an IP unicast address across cable network 14 or PSTN 22. Some routers have security features intended to filter out invalid users who alter or masquerade packets as if sent from a valid user. Since routing policy is under the control of network operators, such filtering is a vendor specific implementation. For example, dedicated interfaces (i.e., Frame Relay) may exist between TRAC 24 and CMTS 12 which preclude filtering, or various forms of virtual tunneling and reverse virtual tunneling could be used to virtually source upstream packets from cable modem 16. For more information on virtual tunneling see Level 2 Tunneling Protocol ("L2TP") or Point-to-Point Tunneling Protocol ("PPTP") in IETF draft documents incorporated herein by reference by Kory Hamzeh, et. al (IETF draft documents are precursors to IETF RFCs and are works in progress).

Cable modem 16 also forwards IP datagrams destined to an IP multicast address across cable network 14 or PSTN 22. Cable modem 16 is configurable to keep IP multicast routing tables and to use group membership protocols. Cable modem 16 is also capable of IP tunneling upstream through the telephony path. A cable modem 16 that wants to send a multicast packet across a virtual tunnel will prepend another IP header, set the destination address in the new header to be the unicast address of CMTS 12 at the other end of the tunnel, and set the IP protocol field to be four, which means the next protocol is IP.

CMTS 12 at the other end of the virtual tunnel receives the packet, strips off the encapsulating IP header, and forwards the packet as appropriate. A broadcast IP capability is dependent upon the configuration of the direct linkage, if any, between TRAC 24 and CMTS 12. CMTS 12, cable modem 16, and TRAC 24 are capable of routing IP datagrams destined to an IP broadcast address which is across cable network 14 or PSTN 22 if so configured. Cable modem 16 is configurable for IP broadcast datagram filtering.

An operating environment for cable modem 16 of the present invention includes a processing system with at least one high speed Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. The electrical system represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

C. Initialization Of Cable Modems

The cable modem 16 includes non-volatile memory for storing configuration file having configuration parameters, or operational parameters, which are parameters that the cable modem 16. The configuration parameters may include factory default settings and parameters that are set during initialization of a connection to the CMTS 12.

The initialization of the connection to the CMTS 12 may begin with a scan for a downstream channel. When a cable modem 16 powers up or is restarted, it attempts to communicate on a downstream channel identified in its configuration file. If one is not included, or if the cable modem is unable to communicate over the designated channel, it scans for an available channel. The cable system 10 may include one or more data channels. The cable modem scans for a channel by tuning to channels successively through the available bandwidth and locking on the first one in which certain characteristics of a signal in a data channel are found. These characteristics may include synchronization of QAM symbol timing, synchronization of Forward Error Control framing, synchronization of MPEG packetization and recognition of the synchronization of MAC messages. If more than one data channel is included, the cable modem will lock on the first one that it finds in the scan.

The steps followed during initialization of the cable modem 16 may depend upon the cable system 10 is uses telephony return or a bi-directional cable connection.

When cable modem 16 is initially powered on, if telephony return is being used, cable modem 16 will receive a Telephony Channel Descriptor ("TCD") from CMTS 12 that is used to provide dialing and access instructions on downstream channels via cable network 14. Information in the TCD is used by cable modem 16 to connect to TRAC 24. The TCD is transmitted as a MAC management message with a management type value of TRI_TCD at a periodic interval (e.g., every 2 seconds). To provide for flexibility, the TCD message parameters are encoded in a Type/Length/Value ("TLV") form. However, other encoding techniques could also be used.

Figure 3:
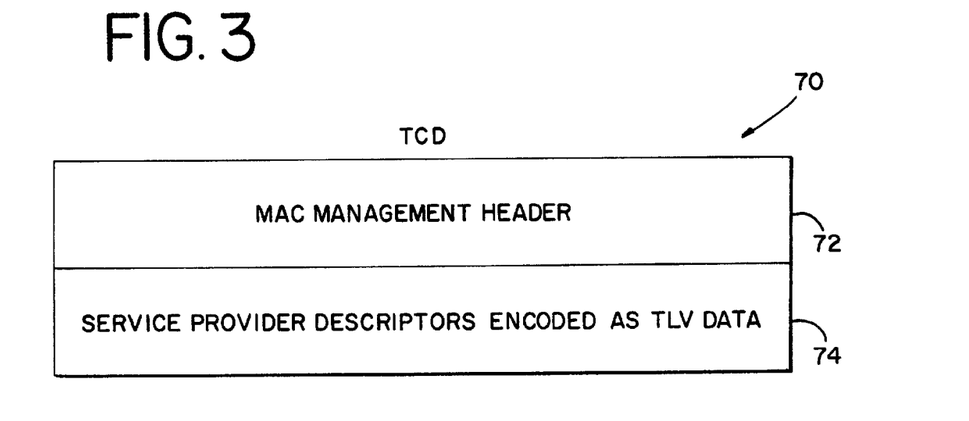
FIG. 3 is a block diagram illustrating a Telephony Channel Descriptor message structure.

FIG. 3 is a block diagram illustrating a TCD message structure 70 with MAC 44 management header 72 and Service Provider Descriptor(s) ("SPD") 74 encoded in TLV format. SPDs 74 are compound TLV encodings that define telephony physical-layer characteristics that are used by cable modem 16 to initiate a telephone call. SPD 74 is a TLV-encoded data structure that contains sets of dialing and access parameters for cable modem 16 with telephony return. SPD 74 is contained within TCD message 70. There may be multiple SPD 74 encodings within a single TCD message 70. There is at least one SPD 74 in TCD message 70. SPD 74 parameters are encoded as SPD-TLV tuples. SPD 74 contains the parameters shown in Table 1 and may contain optional vendor specific parameters. However, more or fewer parameters could also be used in SPD 74.

TABLE 1

| SPD 74 Parameter | Description |
| --- | --- |
| Factory Default Flag | Boolean value, if TRUE(1), indicates a SPD which should be used by cable modem 16. |
| Service Provider Name | This parameter includes the name of a service provider. Format is standard ASCII string composed of numbers and letters. |
| Telephone Numbers | These parameters contain telephone numbers that cable modem 16 uses to initiate a telephony modem link during a login process. Connections are attempted in ascending numeric order (i.e., Phone Number 1, Phone Number 2...). The SPD contains a valid telephony dial string as the primary dial string (Phone Number 1), secondary dial-strings are optional. Format is ASCII string(s) composed of: any sequence of numbers, pound "#" and star "*" keys and comma character "," used to indicate a two second pause in dialing. |
| Connection Threshold | The number of sequential connection failures before indicating connection failure. A dial attempt that does not result in an answer and connection after no more than ten rings is considered a failure. The default value is one. |
| Login User Name | This contains a user name cable modem 16 will use an authentication protocol over the telephone link during the initialization procedure. Format is a monolithic sequence of alphanumeric characters in an ASCII string composed of numbers and letters. |
| Login Password | This contains a password that cable modem 16 will use during authentication over a telephone link during the initialization procedure. Format is a monolithic sequence of alphanumeric characters in an ASCII string composed of numbers and letters. |
| DHCP Authenticate | Boolean value, reserved to indicate that cable modem 16 uses a specific indicated DHCP Server (see next parameter) for a DHCP Client and BOOTP Relay Process when TRUE (one). The default is FALSE (zero) which allows any DHCP Server. |
| DHCP Server | IP address value of a DHCP Server cable modem 16 uses for DHCP Client and BOOTP Relay Process. If this attribute is present and DHCP Authenticate attribute is TRUE(1). The default value is integer zero. |
| RADIUS Realm | The realm name is a string that defines a RADIUS server domain. Format is a monolithic sequence of alphanumeric characters in an ACSII string composed of numbers and letters. |
| PPP Authentication | This parameter instructs the telephone modem which authentication procedure to perform over the telephone link. |

TABLE 1-continued

| SPD 74 Parameter | Description |
| --- | --- |
| Demand Dial Timer | This parameter indicates time (in seconds) of inactive networking time that will be allowed to elapse before hanging up a telephone connection at cable modem 16. If this optional parameter is not present, or set to zero, then the demand dial feature is not activated. The default value is zero. |
| Vendor Specific Extensions | Optional vendor specific extensions. |

A Termination System Information ("TSI") message is transmitted by CMTS 12 at periodic intervals (e.g., every 2 seconds) to report CMTS 12 information to cable modem 16 whether or not telephony return is used. The TSI message is transmitted as a MAC 44 management message. The TSI provides a CMTS 12 boot record in a downstream channel to cable modem 16 via cable network 14. Information in the TSI is used by cable modem 16 to obtain information about the status of CMTS 12. The TSI message has a MAC 44 management type value of TRI_TSI.

Figure 4:
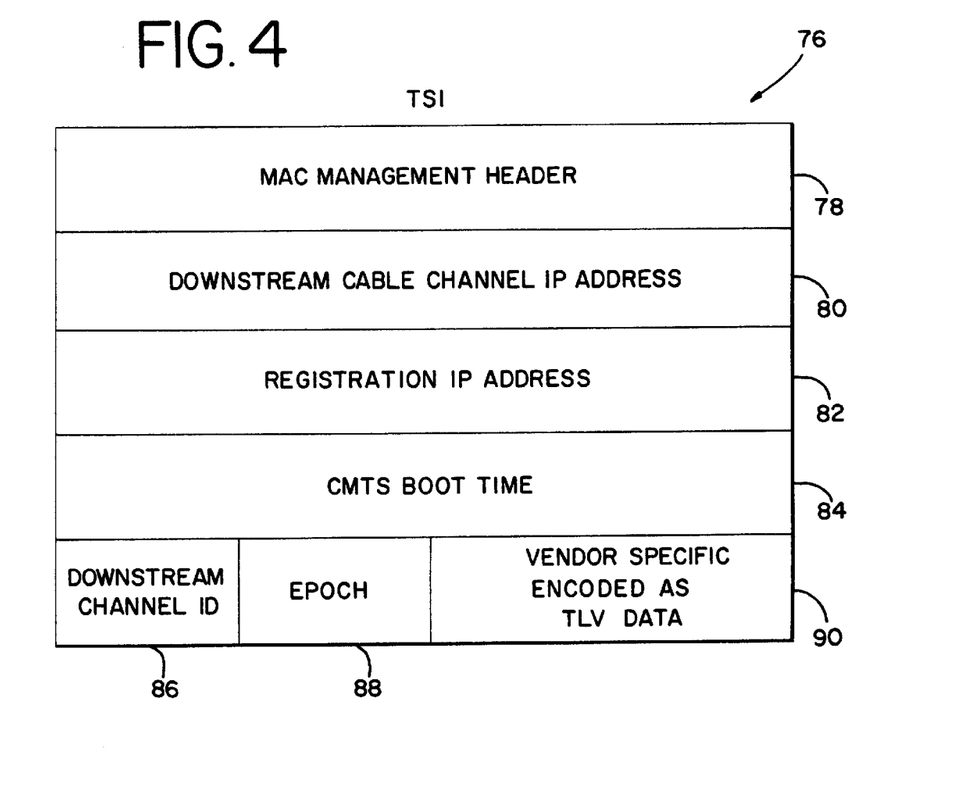
FIG. 4 is a block diagram illustrating a Termination System Information message structure.

FIG. 4 is a block diagram of a TSI message structure 76. TSI message structure 76 includes a MAC 44 management header 78, a downstream channel IP address 80, a registration IP address 82, a CMTS 12 boot time 84, a downstream channel identifier 86, an epoch time 88 and vendor specific TLV encoded data 90.

A description of the fields of TSI message 76 is shown in Table 2. However, more or fewer fields could also be used in TSI message 76.

TABLE 2

| TSI 76 Parameter | Description |
| --- | --- |
| Downstream Channel IP Address 80 | This field contains an IP address of CMTS 12 available on the downstream channel this message arrived on. |
| Registration IP Address 82 | This field contains an IP address cable modem 16 sends its registration request messages to. This address MAY be the same as the Downstream Channel IP address. |
| CMTS Boot Time 84 | Specifies an absolute-time of a CMTS 12 recorded epoch. The clock setting for this epoch uses the current clock time with an unspecified accuracy. Time is represented as a 32 bit binary number. |
| Downstream Channel ID 86 | A downstream channel on which this message has been transmitted. This identifier is arbitrarily chosen by CMTS 12 and is unique within the MAC 44 layer. |
| Epoch 88 | An integer value that is incremented each time CMTS 12 is either re-initiatized or performs address or routing table flush. |
| Vendor Specific Extensions 90 | Optional vendor extensions may be added as TLV encoded data. |

After receiving TCD 70 message and TSI message 76, cable modem 16 continues to establish access to data network 28 (and resources on the network) by first dialing into TRAC 24 and establishing a telephony PPP 50 session. Upon the completion of a successful PPP 50 connection, cable modem 16 performs PPP Link Control Protocol ("LCP") negotiation with TRAC 24. Once LCP negotiation is complete, the cable modem 16 requests Internet Protocol Control Protocol ("IPCP") address negotiation. For more information on IPCP see RFC-1332 incorporated herein by reference. During IPCP negotiation, cable modem 16 negotiates an IP address with TRAC 24 for sending IP data packet responses back to data network 28 via TRAC 24. The cable modem 16 uses this IP address as its original IP address. As described below, this IP address may be used in a client identifier generator to relate the IP address to a unique client identifier.

One advantage of the present invention is that when a client receives the IP address it might request the IP address from the DHCP server in such a way that the DHCP server would think that the client is the one that owned the IP address whereas, the previous owner was a different client.

In a bi-directional system, the cable modem 16 may negotiate the original IP address from the CMTS 12, and generate a client identifier using the first IP address allocated to it by the CMTS 12.

When cable modem 16 has established an IP link to TRAC 24, it begins "upstream" communications to CMTS 12 via DHCP layer 66 to complete a virtual data connection by attempting to discover network host interfaces available on CMTS 12 (e.g., IP host interfaces for a virtual IP connection). The virtual data connection allows cable modem 16 to receive data from data network 28 via CMTS 12 and cable network 14, and send return data to data network 28 via TRAC 24 and PSTN 22. Cable modem 16 must first determine an address of a host interface (e.g., an IP interface) available on CMTS 12 that can be used by data network 28 to send data to cable modem 16. However, cable modem 16 has only a downstream connection from CMTS 12 and has to obtain a connection address to data network 28 using an upstream connection to TRAC 24.

During the process of establishing network host interfaces, each cable modem 16 sends and receives messages to and from the DHCP server. As described in RFC2131, DHCP interaction includes the allocation of IP addresses by the DHCP. In communicating with the DHCP server, the cable modem 16 may receive an allocated IP address, request a selected IP address, or request a previously allocated IP address.

One advantage of the present invention is that the TRAC 24 may include an IP address generator that may be used to distribute IP addresses to cable modems. The allocation of IP addresses is one aspect of the cable modem system that may be tracked by the cable modem managers in the CMTS 12 or the TRAC 24. Each cable modem may maintain externally-obtained IP addresses modem. An externally-obtained IP address is an IP address that is obtained before making DHCP messages via the PPP connection that is made with the telco connection. The CMTS 12 or TRAC 24 may use the externally-obtained IP addresses in queries for other configuration parameters to the DHCP server. Alternatively, the IP address may be obtained using the DHCP server and one advantage of preferred embodiments of the present invention is that the IP address received via the PPP connection may be permanently designated to the cable modem.

D. IP Addresses and Configuration Parameters for Network Administration

Figure 5:
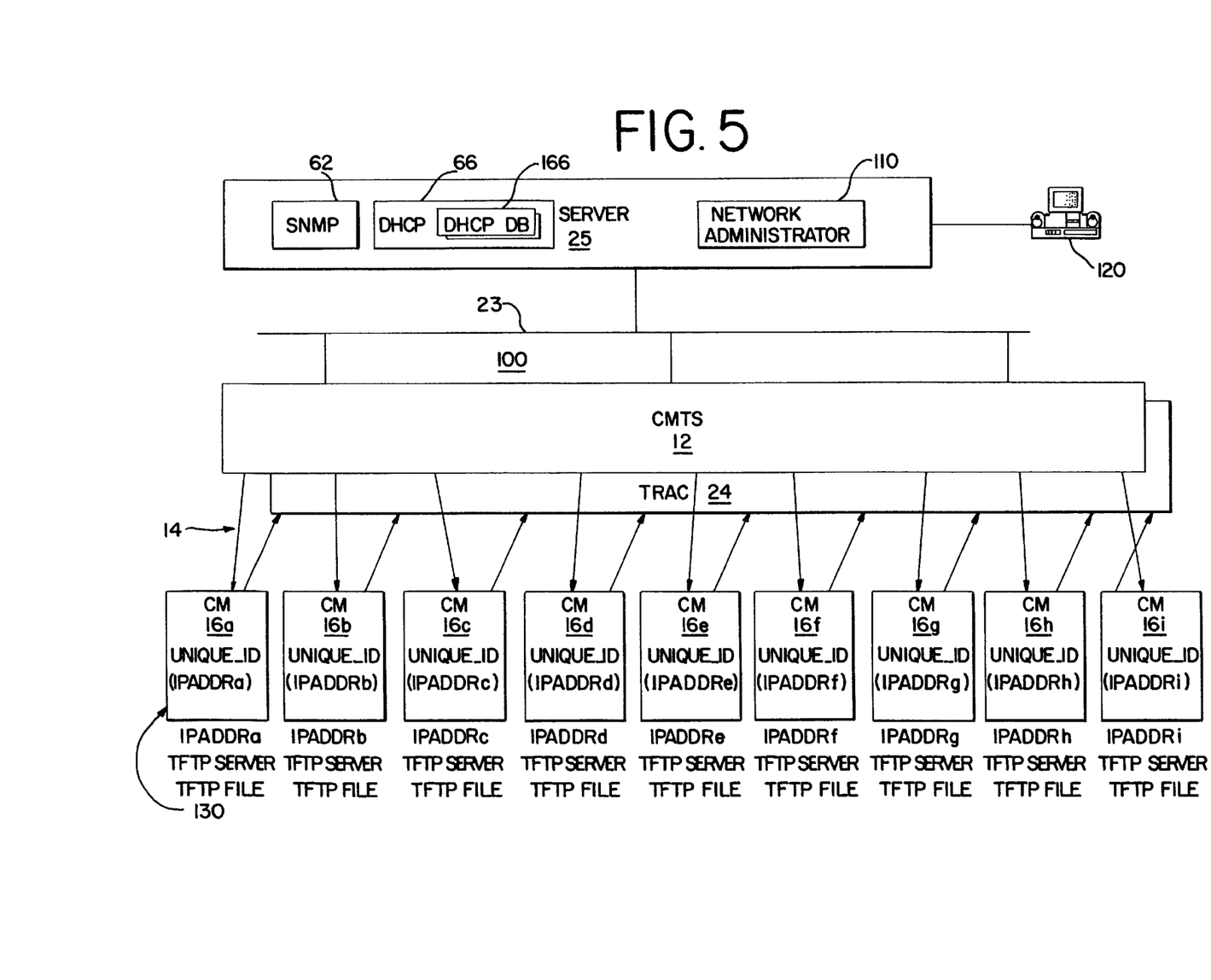
FIG. 5 is a block diagram of a cable modem system showing multiple cable modems and multiple cable modem termination systems with initial configuration settings for the cable modems.

FIG. 5 is a block diagram of a cable system 100 showing the CMTS 12 and TRAC 24 connected to multiple cable modems 16a–i. The cable system 100 is connected to the server 25 which includes an SNMP manager 62, the DHCP server 66 and a network administrator 110. The server includes an interface to a network management station 120, which may include programs that communicate with the DHCP server 66, the SNMP manager 62 and the network administrator 110.

The server 25 is connected to the CMTS 12 and to the TRAC 24 over the local network 23, which may include any suitable network (Ethernet, token ring, etc.). The CMTS 12 are connected to the cable modems 16*a–i* by cable network 14. FIG. 5 illustrates a bi-directional connection, which represents either a bi-directional network, or a cable network using telephony return.

During initialization, IP addresses are negotiated by the TRAC 24 for the cable modems 16. Other configuration information may also be communicated between the CMTS 12 and the CM 16. The configuration parameters 130 received may include an IP address IPADDRa-i, a trivial file transport protocol (TFTP) server name and a TFTP file name. The TFTP file is a configuration file that includes the configuration parameters that the cable modems 16*a–i* use to communicate over the Internet. Once the initialization and registration functions have been performed, the cable modem 16 store a copy of the configuration file designated for it. The cable modems 16*a* et seq. also generate client identifiers using a Unique_identifiers (IPADDR) function for generating unique client identifiers.

Figure 6A:
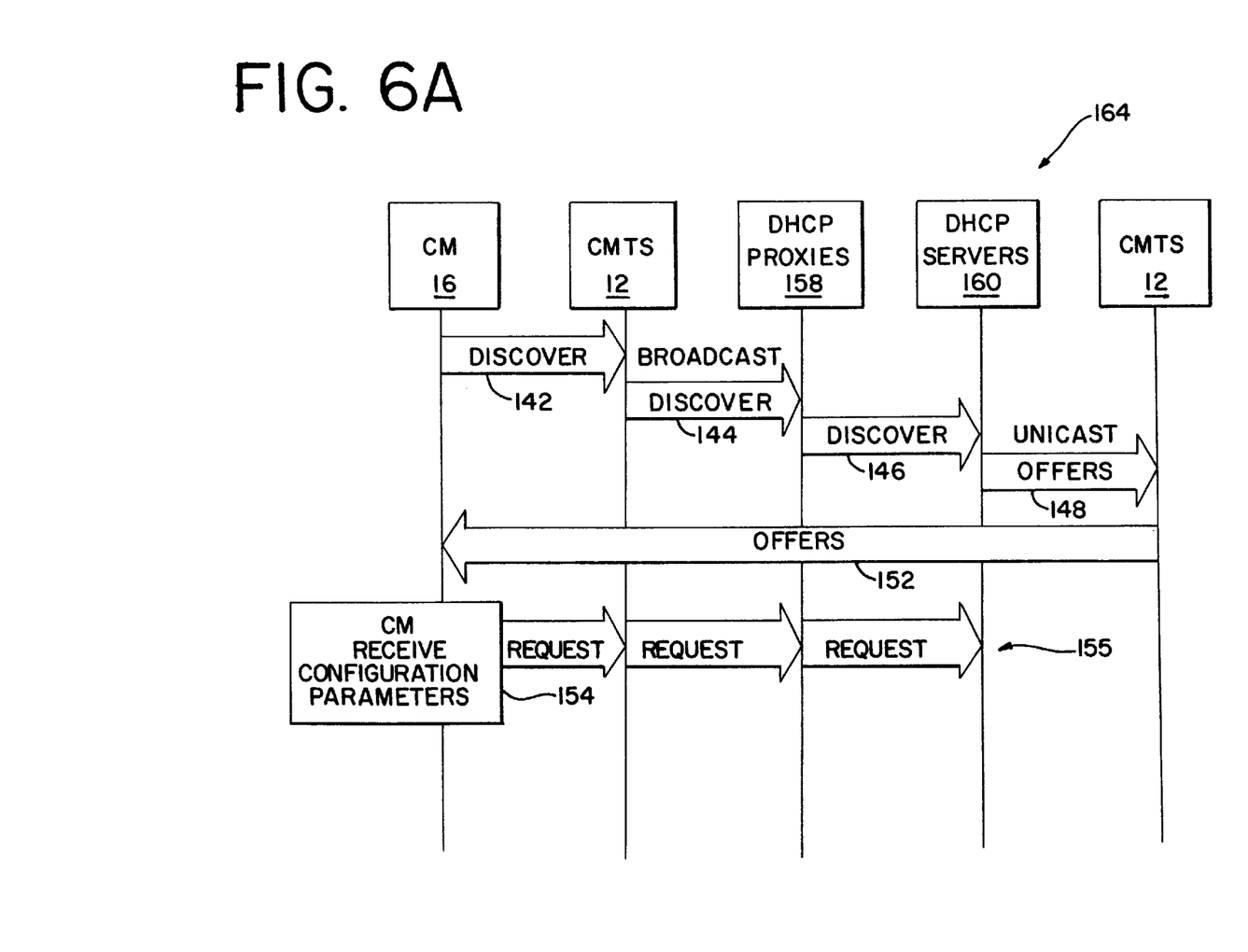
FIG. 6A shows the message flow of DHCP messages for assigning an IP address to the cable modem in FIG. 1.

FIG. 6A shows a process for permanently setting an IP address (IPADDRn) for one of the cable modems 16*a–i* using a client identifier that has been generated by the Client ID generator 120. The process uses the message exchanges described in RFC 2131 for discovering network hosts. The cable modem 16 sends a DHCPDISCOVER message 142 to the CMTS 12, which issues a broadcast DHCPDISCOVER message 144 to the DHCP proxies 15 (see FIG. 1). The DHCP proxies 15 send a relayed DHCPDISCOVER message 146 to the DHCP servers 66 on the Internet. Each available DHCP server 66 responds by sending unicast DHCPOFFER message 148, which is received by the CMTS 12. The CMTS 12 sends the DHCPOFFER messages 152 to the cable modems 16*a–i*. The cable modem 16 receives the configuration parameters 130, sets the parameters at 154 and notifies the DHCP server 66 of its acceptance by sending a DHCPREQUEST message 155 to request any remaining configuration parameters.

In a preferred embodiment, the TRAC 24 manages and retrieves or generates IP addresses for each cable modem 16. The IP addresses are used in the DHCPDISCOVER message 144 broadcast to the DHCP servers 66. The IP addresses are preferably used in a DHCPDISCOVER message that includes a client identifier for the cable modem 16 in the DHCP parameters of the DHCPDISCOVER message. The client identifier is a function of the IP address. When the IP address is used in the function, the same unique client identifier is always returned. For example, in a preferred embodiment, the function Fn (IP address)='NBB'+ IP address.

FIG. 6B shows a DHCP parameter list 165 used in the DHCPDISCOVER message 144 sent by the CMTS 12 to the DHCP servers 66. A selected IPADDRn (for cable modem 16*n*, where n is 1–16 as shown in FIG. 5) is put in the ciaddr field at 167. The IPADDRn is used in a client identifier function, client_identifier=UNIQUE_IDENTIFIER (IPADDRn), such that the function UNIQUE_IDENTIFIER () returns a unique client identifier for a given IP address. The value for the client identifier function is used in the options field 169 in the parameter list 165. The advantage of using the parameter list 165 in FIG. 6B is that the DHCP server 66 uses the client identifier value in the options field 169 as an index into the DHCP database 166 (in FIG. 5) as specified in RFC 2132 (incorporated by reference herein in its entirety).

FIG. 7 shows the values of IP addresses according to the index (client identifier) into DHCP database 166. The DHCP database 166 will always return the designated IP address regardless of whether any lease time has expired. In addition, the DHCP database 166 will return the designated IP address even if it has been allocated to another device on the Internet.

While the invention has been described in conjunction with presently preferred embodiments of the invention, persons of skill in the art will appreciate that variations may be made without departure from the scope and spirit of the invention. For example, one of ordinary skill in the art will appreciate that the methods described herein may be carried out in different types of networks that are not cable modem networks. This true scope and spirit is defined by the appended claims, interpreted in light of the foregoing.

I claim:

1. A method for permanently allocating an Internet protocol (IP) address for a network device in a network using a dynamic host configuration protocol (DHCP) server comprising the steps of:

generating a unique client identifier using the IP address in a client identifier function;

setting the IP address in a selected IP address parameter and the client identifier in an options parameter field in a DHCP parameter list;

sending the DHCP parameter list in a DHCPDISCOVER message to the DHCP server;

receiving a DHCPOFFER message from the DHCP server; and using the IP address and the client identifier in subsequent DHCP messages to the DHCP server.

2. A method as claimed in claim 1 further comprising the step of maintaining the client identifier and the IP address for the network device using a Client ID generator.

3. A method as claimed in claim 2 further comprising the step of generating at least one client identifier using the IP address.

4. A method as claimed in claim 3 further comprising the step of determining the IP addresses of the network devices by querying the DHCP server using the client identifiers of the network devices.

5. A method as claimed in claim 1 wherein the network devices are cable modems.

6. A method as claimed in claim 5 wherein the cable modems are connected to a cable modem termination system.

7. A method as claimed in claim 6 wherein the cable modem includes the Client ID generator.

8. A method as claimed in claim 5 wherein the cable modems are connected on an upstream connection to a telephony return access concentrator and on a downstream connection to a cable modem termination system.

9. A method as claimed in claim 8 wherein the telephony return access concentrator generates an original IP address for each cable modem.

10. An improved system for allocating an Internet protocol (IP) address to a network device connected to a network having a dynamic host configuration protocol (DHCP) server, the improvement comprising:

an Client ID generator for generating a client identifier as a function of the IP address; and a DHCP parameter list having a selected IP address set to the IP address and a DHCP option field set to the client identifier.

11. The improved system as claimed in claim 10 wherein the network device is a cable modem.

12. The improved system as claimed in claim 11 wherein the cable modem is connected to a cable modem termination system.

13. The improved system as claimed in claim 12 wherein the cable modem includes the Client ID generator.

14. The improved system as claimed in claim 11 wherein the cable modem includes an upstream connection to a telephony return access concentrator.

15. A method for permanently allocating an Internet protocol (IP) address for a network device in a network using a server having means for allocating IP addresses comprising the steps of:

generating a unique client identifier using the IP address in a client identifier function;

setting the IP address in a selected IP address parameter and the client identifier in an options parameter field in a server parameter list;

sending the server parameter list in a server message to the server having means for allocating IP addresses;

receiving a server IP address offer message from the server having means for allocating IP addresses; and using the IP address and the client identifier in subsequent server messages to the server having means for allocating IP addresses.

16. A method as claimed in claim 15 further comprising the step of maintaining the client identifier and the IP address for the network device using a Client ID generator.

17. A method as claimed in claim 16 further comprising the step of generating at least one client identifier using the IP address.

18. A method as claimed in claim 17 further comprising the step of determining the IP addresses of the network devices by querying the server having means for allocating IP addresses using the client identifiers of the network devices.

19. An improved system for allocating an Internet protocol (IP) address to a network device connected to a network having a server providing means for allocating IP addresses, the improvement comprising:

an Client ID generator for generating a client identifier as a function of the IP address; and a server parameter list having a selected IP address set to the IP address and a server option field set to the client identifier.

* * * * *